Aug. 9, 1966  T. W. WALDROP  3,265,444
HARVESTER SPOUT CONTROL
Filed May 13, 1965  2 Sheets-Sheet 1
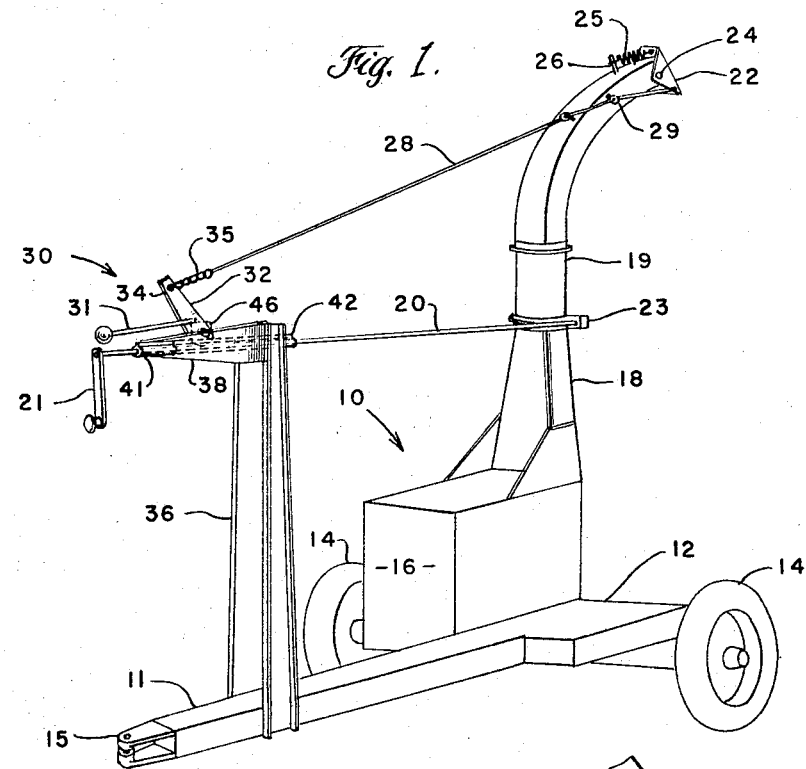
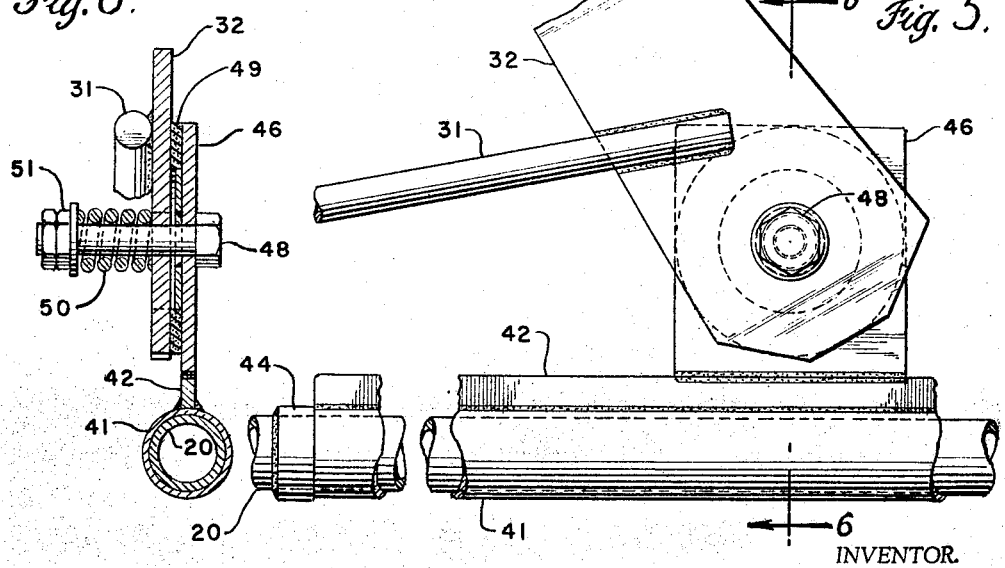
INVENTOR.
THOMAS W. WALDROP
BY Walter V. Wright
AGENT Aug. 9, 1966 T. W. WALDROP 3,265,444
HARVESTER SPOUT CONTROL
Filed May 13, 1965 2 Sheets-Sheet 2

INVENTOR.
THOMAS W. WALDROP
BY Walter V. Wright
AGENT

United States Patent Office 3,265,444
Patented August 9, 1966

3,265,444
HARVESTER SPOUT CONTROL
Thomas W. Waldrop, Ronks, Pa., assignor to Sperry Rand Corporation, New Holland, Pa., a corporation of Delaware
Filed May 13, 1965, Ser. No. 455,499
9 Claims. (Cl. 302—61)

This invention relates generally to harvesters. More specifically, it relates to a means for accurately directing the stream of crop material that is discharged from a harvester discharge spout during operation.

Harvesters are well known agricultural implements which cut and chop forage or other crops and expel a stream of chopped crop material through a spout into a nearby parallel traveling wagon, truck, or other receiving unit. The discharge spouts are located at the rear of the harvesters and are mounted to swivel for either lateral or rear discharge.

Some farmers employ special forage receiving units with their harvesters. These units have closed tops which prevent the forage from blowing or spilling out of the unit. They are provided with a relatively small inlet opening through which the stream of crop material issuing from the harvester spout must be directed. More commonly, the harvester discharges material into a conventional high sided wagon or truck. If the wagon or truck travels along side the harvester, the stream of crop material is directed perpendicular to the narrow dimension of the wagon. It must be directed over the top of the adjacent wagon side and below the top of the remote wagon side. This leaves little room for error in guiding the stream of crop material. Even when the wagon is towed behind the forage harvester, it is necessary to have accurate control of the stream of material discharged from the spout in order to fill the corners and sides of the wagon close to the top without missing the wagon.

Most harvesters have a deflector member mounted on the spout at the discharge end thereof which engages and deflects, or guides, the stream of material leaving the spout. These deflectors are manually positionable by a control member commonly located at the front of the machine within reach of the operator of a tractor towing the harvester. Thus, by controlling the position of the deflector, the operator can readily direct the stream of material into the receiving opening of the receiving unit. In actual practice, however, it is found that although the operator accurately sets the deflector control member, the direction of the dicharging stream of material fluctuates during operation causing material to miss the receiving unit and be lost on the ground. It is primarily to the solution of this problem that the efforts of the present invention are directed.

It is an object of this invention to provide control means for the discharge spout of a harvester or the like which reduces crop losses resulting from the stream of harvested material missing the receiving unit.

It is another object of this invention to provide control means for the discharge spout of a harvester or the like which virtually eliminates fluctuation of the stream of harvested material from any given manually selectable path during operation.

It is another object of this invention to provide control means for the discharge spout of a harvester or the like which provides extremely accurate and predictable manual control of the path of discharge of material from the harvester.

It is another object of this invention to provide control means according to the above objects which is mechanically simple and of basically rugged design.

It is another object of this invention to provide control means according to the above objects at negligible increase in the manufacturing cost over that of conventional control means.

These and other objects and advantages of this invention will be apparent upon reference to the following description and claims taken in conjunction with the accompanying drawings wherein:

FIG. 1 is a semi-diagrammatic front perspective view of a forage harvester illustrating the discharge control means of the present invention;

FIG. 5 is an enlarged fragmentary side elevational view similar to FIG. 2 illustrating details of the control member mounting; and FIG. 6 is a sectional view taken on the line 6—6 of FIG. 5.

Figure 3:
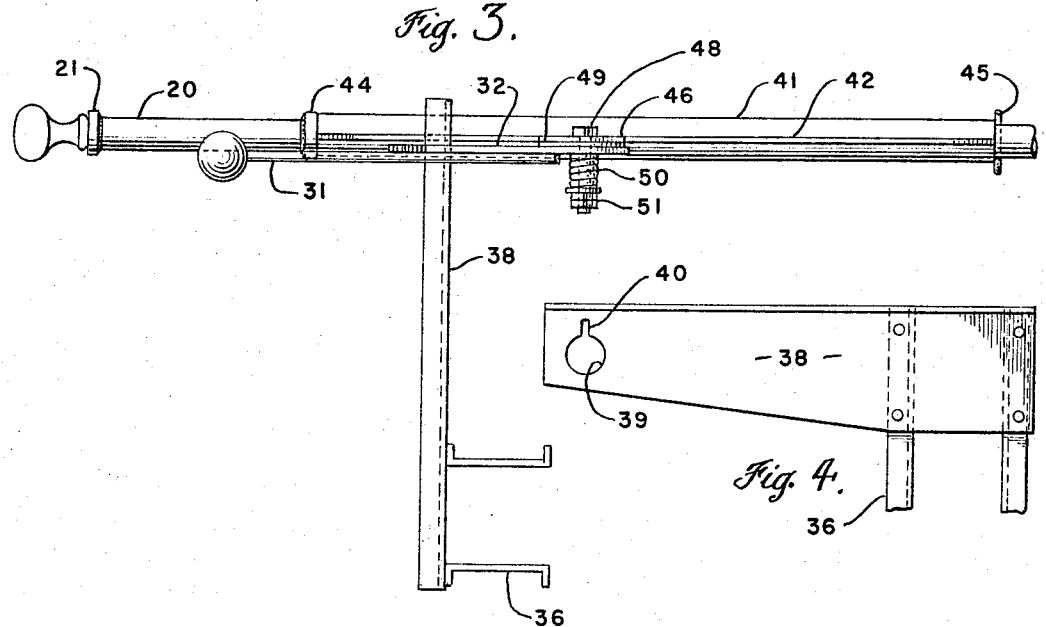
FIG. 3 is a plan view of the apparatus shown in FIG. 2.

Referring now to the drawings in detail, particularly to FIG. 1, the reference numeral 10 indicates, generally, a conventional forage harvester having a front end 11 and a rear end 12. Ground engaging support wheels 14 are journalled on the forage harvester frame adjacent the rear end thereof and support the machine for movement over the ground. A towing hitch 15 is provided at the front end 11 of the harvester frame and is adapted to be coupled with a conventional farm tractor or the like. The reference numeral 16 indicates the main body or housing of the forage harvester. As is well known in the art, various types of header units, depending on the type of crop to be harvested, are removably attachable to the front of main body portion 16. Such header units cut or gather crop material and deliver it rearwardly into housing 16 wherein the material is chopped into fine particles and thrown from the machine into a trailing wagon or the like.

The chopped crop material is discharged through a spout having a lower section 18 fixedly mounted on the main harvester body at the rear end thereof. The upper portion 19 of the discharge spout is carried by fixed portion 18 for swiveling movement relative thereto between a plurality of positions affording lateral or rearward discharge. It is also well known in the art to provide a forwardly extending control rod 20 operatively connected at 23 to spout section 19 by a worm gear or the like (not shown) for swiveling the spout between its various operating positions. A handle 21 is provided on control rod 20 at the front of the harvester in a position within reach of the operator of a tractor coupled to draft hitch 15.

A deflector member 22 is pivotally mounted at 24 on the open discharge end of spout section 19. A spring 25 is connected to deflector member 22 and anchored to a pin 26 fixedly carried by the spout. In FIG. 1 it will be apparent that spring 25 biases deflector plate 22 in a counter-clockwise direction about pivot member 24. A cable 28 is connected to deflector member 22 at the end of the deflector member opposite the end engaging spring 25. Cable 28 extends forwardly from deflector member 22 through a cable guide 29 and forwardly to the front end of the harvester.

Figure 2:
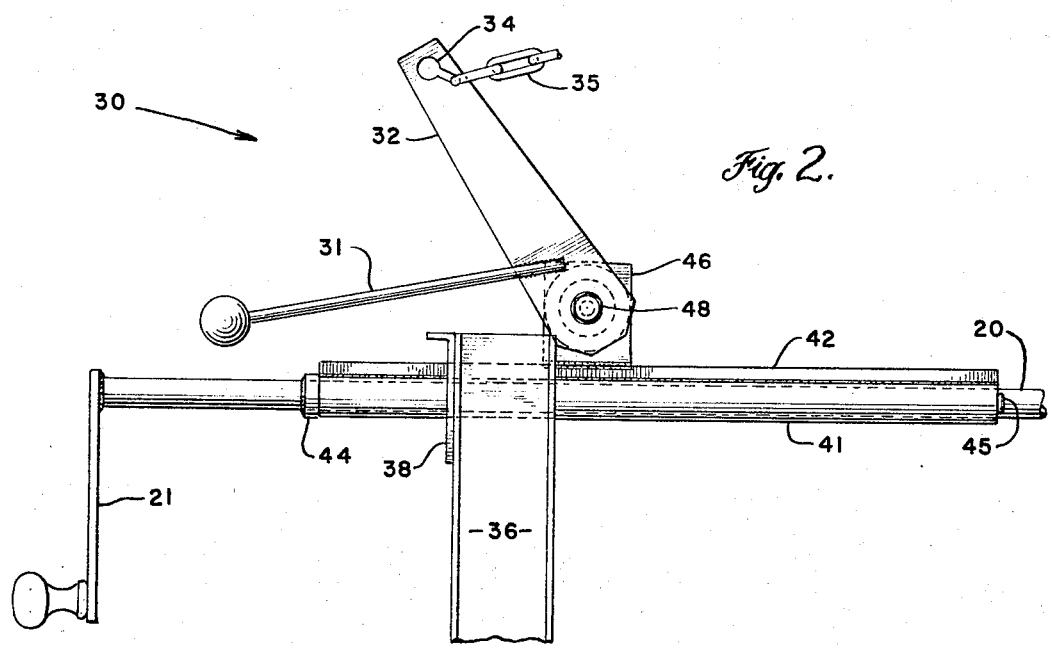
FIG. 2 is a fragmentary side elevation view of the front portion of the control means of the present invention.

Control means, generally indicated by the reference numeral 30 is provided for deflector member 22 at the front end of the harvester. The control means shown is in the form of a bell crank, one arm of which constitutes a manual control handle 31. Arm 31 extends generally forwardly to within reach of the operator of a tractor coupled to hitch 15. The other arm 32 of the bell crank-like control means extends upwardly and is provided at its upper end with a keyhole-shaped slot 34 best seen in FIG. 2. A relatively short length of chain 35 is connected to the forward end of cable 28 and removably anchored in keyhole-shaped slot 34. From the above it will be apparent that manual fore-and-aft movement of control arm 32 along with the action of spring 25 acts through cable 28 to position deflector member 22 into and out of the path of a stream of crop material discharging from the spout. The stream of crop material engages deflector 22 and is guided, or directed, thereby. It will also be readily apparent that position adjustments of handle 31 in compensation for differences between tractors or tractor operators, or operating positions of the discharge spout, are readily accomplished by varying the link of chain 35 which is received in keyhole slot 34 of arm 32.

Figure 4:
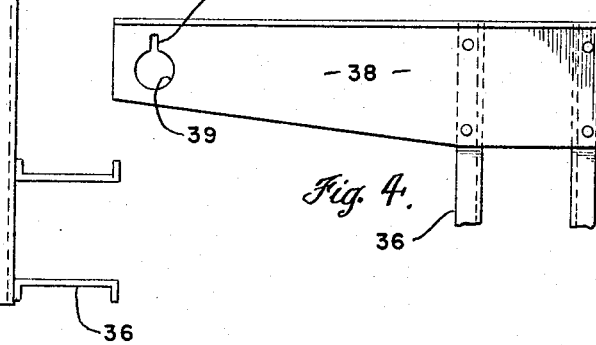
FIG. 4 is a detail view of the mounting bracket visible in FIGS. 2 and 3.

A stanchion 36 is carried by the harvester frame adjacent the front end thereof near hitch 15. Stanchion 36 carries a laterally extending bracket 38 having a hole 39 therethrough adjacent one end (see FIG. 4). A key way type groove 40 is formed at the upper edge of hole 39. An elongated sleeve 41 is supported in hole 39 for free fore-and-aft movement relative to bracket 38. An elongated vertical key 42 is fixed atop sleeve 41 and extends through key way type slot 40. Key 42 and slot 40 prevent rotation of sleeve 41 about its longitudinal fore-and-aft extending axis while permitting free fore-and-aft sliding movement between sleeve 41 and bracket 38. The aforementioned control rod 20 extends axially through sleeve 41 and is journalled therein for free rotation relative thereto. A collar 44 is fixedly attached, as by welding, to control rod 20 and abuts the forward-most end of sleeve 41. A removable pin 45 extends transversely through control rod 20 and abuts the rearmost end of sleeve 41. Thus, sleeve 41 is relatively rotatable but axially fixed to control rod 20 while being axially movable and rotatably fixed relative to supporting bracket 38.

An upstanding plate 46 is welded atop elongated key 42 as may be seen in FIG. 6. A pivot bolt 48 is carried by plate 46 in a fixed position relative thereto. Referring to FIG. 6, the cable control arm 32 is pivotally carried by pivot bolt 48. A friction plate 49 is interposed between plate 46 and control arm 32. A spring 50 is carried by pivot member 48 and urges the surface of one side of control arm 32 and the surface of one side of plate 46 into frictional engagement with the opposing sides of interposed friction plate 49. It will be apparent that the binding action of this joint may be varied by adjusting clamping and locking nuts 51 toward or away from spring 50 to vary the spring tension. The frictional locking means associated with control arm 32 and pivot bolt 48 is such that any manually selected position relative to pivot 48 to which arm 32 is moved by handle 31 will be held in opposition to the tension of deflector spring 25 and the force of the stream of crop material engaging deflector 22.

In general appearances and in manufacturing cost, the above structure is similar to conventional control mechanism on present day harvesters. During a harvesting operation, however, forage harvester frames are subject to extremely high stress loads both from the reaction forces of the harvesting mechanism and from the draft loads imposed on the frame by the towing vehicle, and the wagon or other receiving unit which is trailed from the frame of the forage harvester. Conventional deflector control mechanism designs fail to consider and compensate for the results of these stresses. In operation, the frame of a forage harvester undergoes constant deflection. Referring to FIG. 1, with the deflector member 22 mounted at one end of the harvester frame and the control means 30 therefor disposed at the opposite end of the implement frame, frame deflection in the fore-and-aft direction has the effect on the deflector control mechanism of constantly moving the control at the front of the machine toward and away from the discharge spout.

Thus, while a control arm such as 32 is held in a fixed position relative to the frame, it is constantly moving relative to deflector member 22. In conventional control mechanisms, this produces the same effect on deflector 22 as constantly changing the position of control arm 32 about its pivotal mounting. With each frame fluctuation, or deflection, under conventional designs the deflector plate 22 fluctuates relative to the discharging stream of crop material and deflects the stream out of its intended path. This causes the stream of crop material to miss its target, the receiving unit, and results in material being discharged on the ground and lost.

In accordance with the present invention, sleeve 41 which carries pivot bolt 48, is free to move in the fore-and-aft direction relative to its supporting bracket 38 and stanchion 36 in response to fore-and-aft deflection of the harvester frame. Its fixed point relative to the discharge spout in the fore-and-aft direction is the spout itself at the swiveling connection 23. Thus, upon fore-and-aft frame deflection during operation, the control arm 32 which is carried by sleeve 41 remains a constant distance from the discharge spout and actually moves in the fore-and-aft direction relative to supporting bracket 38 and stanchion 36 in compensation for fore-and-aft deflection of the implement frame. This results in the elimination of fluctuations in the setting of deflector plate 22 and affords extremely accurate and predictable control of the stream of material discharging from spout 19.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A harvester comprising a mobile frame, a spout on said frame through which a stream of harvested crop material is discharged, means on said spout engageable with said stream of material for varying the direction of discharge of said stream, a control member spaced from said spout and manually movable toward and away from said spout, means interconnecting said control member and said stream directing means for operating said directing means in response to changes in the distance between said control member and said spout, and means supporting said control member on said frame for movement relative thereto in response to frame deflection whereby said distance is unchanged by deflection of said frame during a harvesting operation.

2. A harvester comprising a mobile frame having a front end and a rear end, a crop material discharge spout on said frame adjacent one end thereof and through which harvested crop material is discharged, a deflector member movably mounted on said spout in position to engage and direct material discharging from the spout, a manually movable control member operatively connected to said deflector member for controlling the position of said deflector member relative to said spout to control the direction of discharge of material from the spout, and means supporting said control member on said frame adjacent the end thereof opposite said one end for manual operating movement and for displacement relative to said frame in response to frame deflection whereby the position of said deflector member is unaffected by deflection of said frame during harvesting operations.

3. A harvester comprising a frame having a front end and a rear end, wheels on said frame supporting the frame from movement forwardly over the ground, a crop material discharge spout on said frame adjacent said rear end thereof and through which a stream of harvested crop material is discharged, a deflector member pivotally mounted on said spout for movement into and out of said stream of crop material to vary the direction of said stream, a control member manually movable toward and away from said spout, means operatively connecting said control member to said deflector member to pivot the deflector member in response to movement of said control member toward and away from said spout, and means supporting said control member on said frame adjacent said front end thereof for manual movement toward and away from said spout and for fore-and-aft displacement relative to said frame in response to fore-and-aft frame deflection between said ends of the frame whereby the distance between said control member and said spout is unaffected by deflection of said frame during harvesting operations.

4. A harvester comprising a frame having a front end and a rear end, wheels on said frame supporting the frame from movement forwardly over the ground, a crop material discharge spout on said frame adjacent said rear end thereof and through which a stream of harvested crop material is discharged, a deflector member pivotally mounted on said spout for movement into and out of said stream of crop material to direct said stream, pivot means, a control member carried by said pivot means for manual pivotal movement about said pivot means toward and away from said spout, means operatively connecting said control member to said deflector member for pivotally moving said deflector member relative to said stream in response to manual pivoting of said control member about said pivot means toward and away from said spout, means operatively associated with said control member for holding the control member in any given position to which it is manually pivoted, and means supporting said pivot means on said frame adjacent said front end thereof for movement relative to said frame in response to frame deflection whereby the distance between said control member and said spout is unaffected by deflection of said frame during harvesting operations.

5. A harvester comprising a frame having a front end and a rear end, wheels on said frame supporting the frame from movement forwardly over the ground, a draft hitch on said frame at said front end thereof adapting said frame to be towed behind a farm tractor, a crop material discharge spout on said frame adjacent said rear end thereof and through which a stream of harvested crop material is discharged, a deflector member pivotally mounted on said spout for movement into and out of said stream of crop material to direct said stream, a stanchion carried by said frame adjacent said hitch, pivot means located at the top of said stanchion, a control member carried by said pivot means for pivotal movement toward and away from said deflector member and having a manually operable handle disposed within reach of the operator of a farm tractor coupled to said hitch, means operatively connecting said control member to said deflector member for positioning said deflector member relative to said stream of crop material in response to manual pivoting of said control member toward and away from said deflector member, means holding said control member in any position relative to said pivot means to which it is moved by said operating handle, and means supporting said pivot means on said stanchion for free fore-and-aft displacement relative thereto in response to fore-and-aft frame deflection whereby a manually selected position of said deflector member is unaffected by fore-and-aft deflection of said frame between said deflector member and said pivot means during a harvesting operation.

6. A harvester as recited in claim 5 wherein a spring is interconnected between said deflector member and said spout and biases said deflector member in one direction relative to said stream of crop material, and wherein a cable is interconnected between said deflector member and said control member for moving said deflector member in opposition to said spring.

7. A harvester as recited in claim 6 including means adjustably connecting said cable to said control member for varying the position of said operating handle in compensation for differences in tractor operators and farm tractors connectable to said hitch.

8. A harvester as recited in claim 5 wherein said means for holding said control member in any position to which it is moved by said operating handle comprises a first surface on said control member, a second surface on said means supporting said pivot means, a friction plate interposed between said first and second surfaces, and a spring carried by said pivot means and urging said first and second surfaces into planar engagement with opposing sides of said friction plate.

9. A harverter comprising a frame having a front end and a rear end, wheels on said frame supporting the frame for movement over the ground, a draft hitch on said frame at said front end for connecting said frame behind a farm tractor, an oscillatable spout on said frame at said rear end and through which a stream of harvested crop material is discharged, a deflector member pivotally mounted on said spout for movement into and out of said stream of discharging crop material to direct said stream, a stanchion on said frame at said front end adjacent said draft hitch, a fore-and-aft extending annular sleeve adjacent the top of said stanchion, a control rod extending forwardly from said spout to within reach of the operator of a farm tractor coupled to said hitch and manually operable to move said spout between a plurality of discharge positions, said control rod extending axially through said sleeve and being journalled therein, a pivot member fixedly carried by said sleeve, a bell crank control member journalled on said pivot member and having one arm extending upwardly therefrom and the other arm extending forwardly to within reach of the operator of a farm tractor coupled to said hitch, a cable interconnected between said one arm of said bell crank and said deflector member for varying the position of said deflector member relative to said stream of crop material in response to fore-and-aft movement of said one arm about said pivot member, friction means holding said bell crank in any manually selected angular position relative to said pivot member, means fixing said sleeve against fore-and-aft movement relative to said control rod and means supporting said sleeve on said stanchion for free fore-and-aft movement relative thereto whereby frame deflections during a harvesting operation which vary the relative fore-and-aft positions of said stanchion and said spout do not effect the operative relationship of said bell crank and said deflector member.

References Cited by the Examiner
UNITED STATES PATENTS

| | | | |
|---|---|---|---|
| 2,670,839 | 3/1954 | Aasland | 302—61 |
| 2,741,512 | 4/1956 | Stott et al. | 302—61 |
| 3,152,843 | 10/1964 | Zitko | 302—61 |
| 3,202,462 | 8/1965 | Segredo | 302—61 |

EVON C. BLUNK, *Primary Examiner.*

A. H. NIELSEN, *Assistant Examiner.*